(12) United States Patent
Gong

(10) Patent No.: US 12,218,539 B2
(45) Date of Patent: Feb. 4, 2025

(54) STRING LIGHT CONTROLLER WITH CHARGING FUNCTION AND CHARGING DOCK

(71) Applicant: SHEN ZHEN LAMHO PHOTOELECTRICITY & TECHNOLOGY CO., LTD, Shenzhen (CN)

(72) Inventor: Yelin Gong, Fuzhou (CN)

(73) Assignee: SHEN ZHEN LAMHO PHOTOELECTRICITY & TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/651,917

(22) Filed: May 1, 2024

(65) Prior Publication Data

US 2024/0283267 A1    Aug. 22, 2024

(51) Int. Cl.
*H02J 7/00* (2006.01)
*F21S 4/10* (2016.01)
*F21S 9/02* (2006.01)
*F21Y 115/10* (2016.01)
*H05B 45/38* (2020.01)
*H05B 47/195* (2020.01)

(52) U.S. Cl.
CPC .............. *H02J 7/0063* (2013.01); *F21S 4/10* (2016.01); *F21S 9/02* (2013.01); *H02J 7/0044* (2013.01); *H05B 45/38* (2020.01); *H05B 47/195* (2020.01); *F21Y 2115/10* (2016.08)

(58) Field of Classification Search
CPC .......... H02J 7/0063; H02J 7/0044; F21S 4/10; F21S 9/02; H05B 45/38; H05B 47/195; F21Y 2115/10

USPC .......................................................... 320/114
See application file for complete search history.

(56) References Cited

U.S. PATENT DOCUMENTS

| | | | | |
|---|---|---|---|---|
| 6,276,822 B1 * | 8/2001 | Bedrosian | ............. | F21S 43/195 |
| | | | | 362/651 |
| 2009/0273303 A1 | 11/2009 | Peng | | |
| 2011/0285300 A1 | 11/2011 | Yang | | |
| 2017/0012448 A1 * | 1/2017 | Miller | ................... | H02J 7/0029 |

(Continued)

FOREIGN PATENT DOCUMENTS

| | | | | |
|---|---|---|---|---|
| CN | 203539515 U | * | 4/2014 | ............. A61F 7/007 |
| CN | 111780021 A | * | 10/2020 | ........... H05B 45/345 |
| CN | 2162166491 U | * | 4/2022 | .............. H02M 1/00 |

(Continued)

*Primary Examiner* — M Baye Diao
(74) *Attorney, Agent, or Firm* — Hemisphere Law, PLLC; Zhigang Ma

(57) ABSTRACT

The present invention discloses a string light controller with a charging function and a charging dock. The string light controller comprises a shell, wherein a main board and a rechargeable battery electrically connected with the main board are installed on the shell, the main board is connected with the rechargeable battery through a battery charging and discharging management circuit, and the main board is provided with a charging socket connected with the battery charging and discharging management circuit; and a port of the charging socket is arranged outside the shell, a plug for connecting a string light is arranged on the shell, and the plug is electrically connected with the main board. The charging dock for charging the string light controller is also provided.

6 Claims, 13 Drawing Sheets

(56) References Cited

U.S. PATENT DOCUMENTS

2024/0090101 A1    3/2024  Yan et al.

FOREIGN PATENT DOCUMENTS

| CN | 218209100 U | * | 1/2023 | ................ F21L 4/00 |
| --- | --- | --- | --- | --- |
| DE | 202006004582 U1 | * | 7/2006 | ............ H02J 7/0013 |
| DE | 202010015883 U1 | * | 3/2011 | ........... H01R 31/065 |
| DE | 202011104235 U1 | * | 1/2012 | ......... H05B 33/0809 |
| EP | 1627772 A1 | * | 2/2006 | ........... B60Q 1/2696 |
| GB | 2434259 A | * | 7/2007 | ........... B60Q 3/0279 |

* cited by examiner

STRING LIGHT CONTROLLER WITH CHARGING FUNCTION AND CHARGING DOCK

TECHNICAL FIELD

The present invention relates to the technical field of lights, in particular to a string light controller with a charging function and a charging dock.

DESCRIPTION OF RELATED ART

It is commonly known that string lights are frequently used in everyday life for both functional lighting and decorative purposes. The light strings can create different lighting effects when arranged in different shapes, thereby being extremely popular with users.

In structure, conventional string lights are formed by a controller, a wire, and light bulbs placed on the wire. In use, they usually need to be plugged into a power source through the controller, which then supplies power to the wire, causing the light bulbs to emit light. This design either requires the availability of electrical sockets or the additional use of a portable power supply or battery holder. Otherwise, the string lights cannot be used normally, resulting in practical limitations that hinder their daily use and market promotion.

BRIEF SUMMARY OF THE INVENTION

In view of the shortcomings in the prior art, the present invention provides a string light controller with a charging function and a charging dock.

To achieve the above objective, the present invention adopts the following technical scheme.

A string light controller with a charging function comprises a shell, wherein a main board and a rechargeable battery electrically connected with the main board are installed on the shell, the main board is connected with the rechargeable battery through a battery charging and discharging management circuit, and the main board is provided with a charging socket connected with the battery charging and discharging management circuit; and a port of the charging socket is arranged outside the shell, a plug for connecting a string light is arranged on the shell, and the plug is electrically connected with the main board.

Preferably, the main board is provided with indicator light beads, an infrared receiving module for receiving infrared signals and buttons for user operation, and the shell is provided with corresponding hollowed-out parts at positions exactly opposite to the light beads, the infrared receiving module and the buttons.

Preferably, a light-pervious cover plate is arranged at the hollowed-out parts of the shell, the cover plate is provided with raised pressing caps at positions corresponding to the buttons, and the pressing caps abut against pressing rods of the buttons.

Preferably, the shell is provided with a soft rubber plug for sealing the charging socket at the position of the charging socket.

Preferably, the main board is further integrated with a main control chip, a standby low-power control circuit, a booster circuit and a string light driving circuit; the battery charging and discharging management circuit comprises a battery protection circuit and a charging protection circuit, one end of the battery protection circuit is connected with the rechargeable battery, and the other end of the battery protection circuit is connected with the charging protection circuit and outputs a working power supply; and the main control chip is connected with the infrared receiving module, the light beads, the buttons, the charging protection circuit, the standby low-power control circuit and the string light driving circuit.

Preferably, one end of the shell is further provided with a suspension loop, and the suspension loop is hinged to the shell.

A charging dock for charging the string light controller as described above comprises a base, wherein at least one slot allowing the string light controller to be inserted therein is arranged on the base, a charging plug mating with the charging socket of the string light controller is arranged in the slot, a power socket for connecting an external adapter is arranged on the base, and all the charging plugs are connected with the power socket.

According to the above scheme, the present invention involves the installation of the rechargeable battery within the string light controller, along with the necessary circuits to enable charging. This design allows the string light controller to function as both a power source and a charger, providing convenience for indoor and outdoor use. This feature greatly benefits market promotion and daily applications.

DETAILED DESCRIPTION OF THE INVENTION

Figure 1:
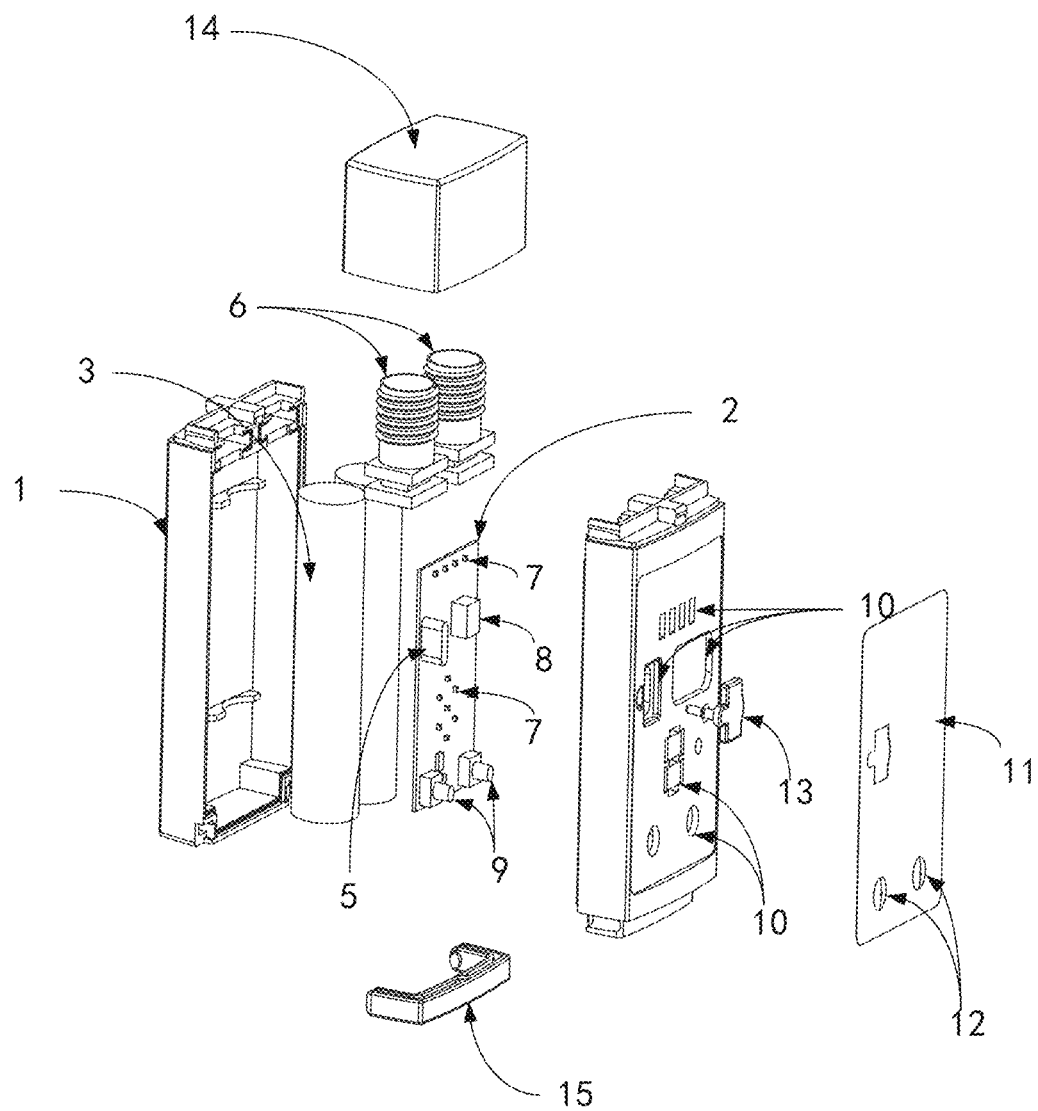
FIG. 1 is a structural diagram of a string light controller according to an embodiment of the present invention.
Figure 2:
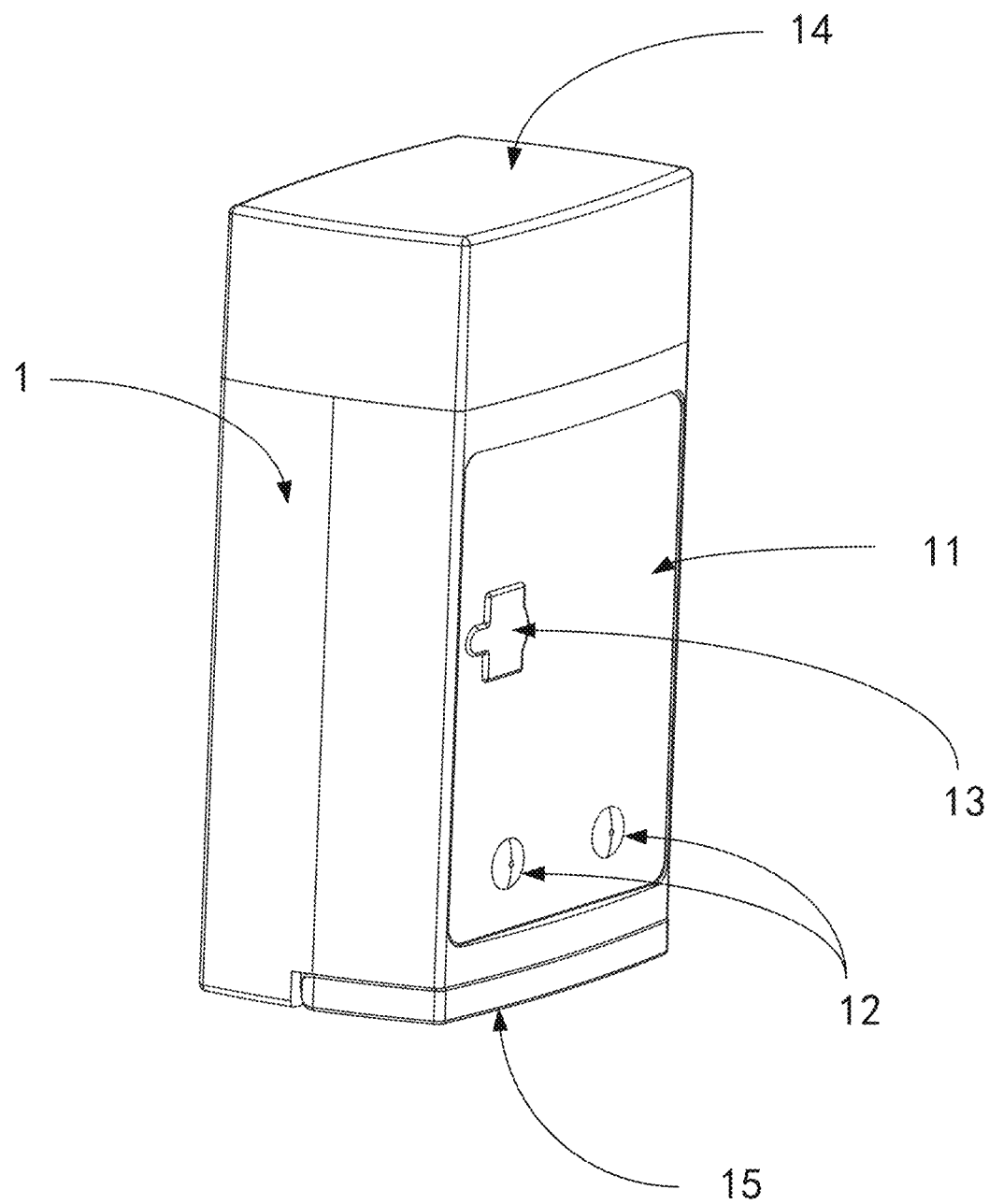
FIG. 2 is a perspective view of a string light controller according to an embodiment of the present invention.
Figure 3:
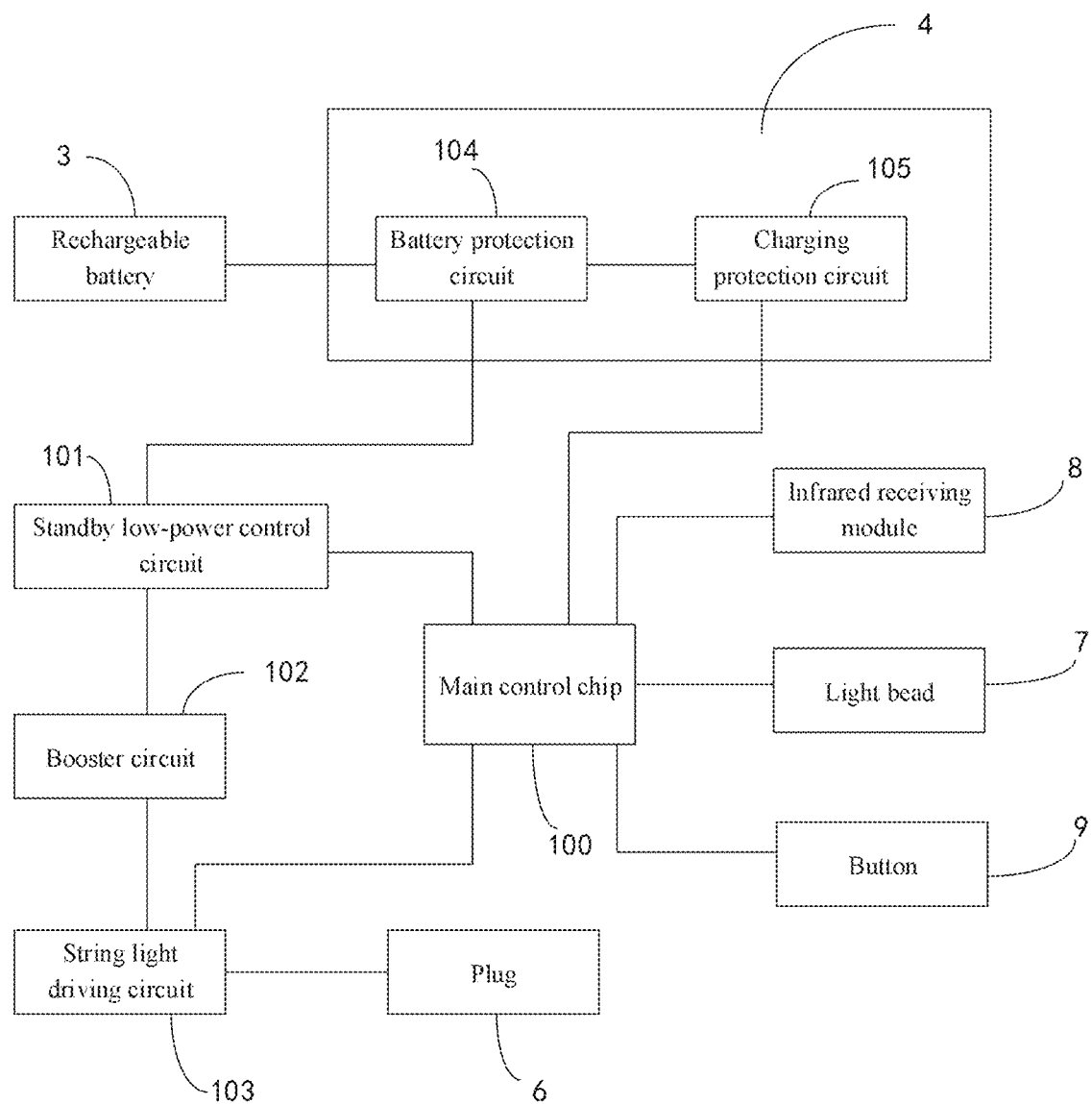
FIG. 3 is a schematic diagram of a circuit system of a string light controller according to an embodiment of the present invention.
Figure 4:
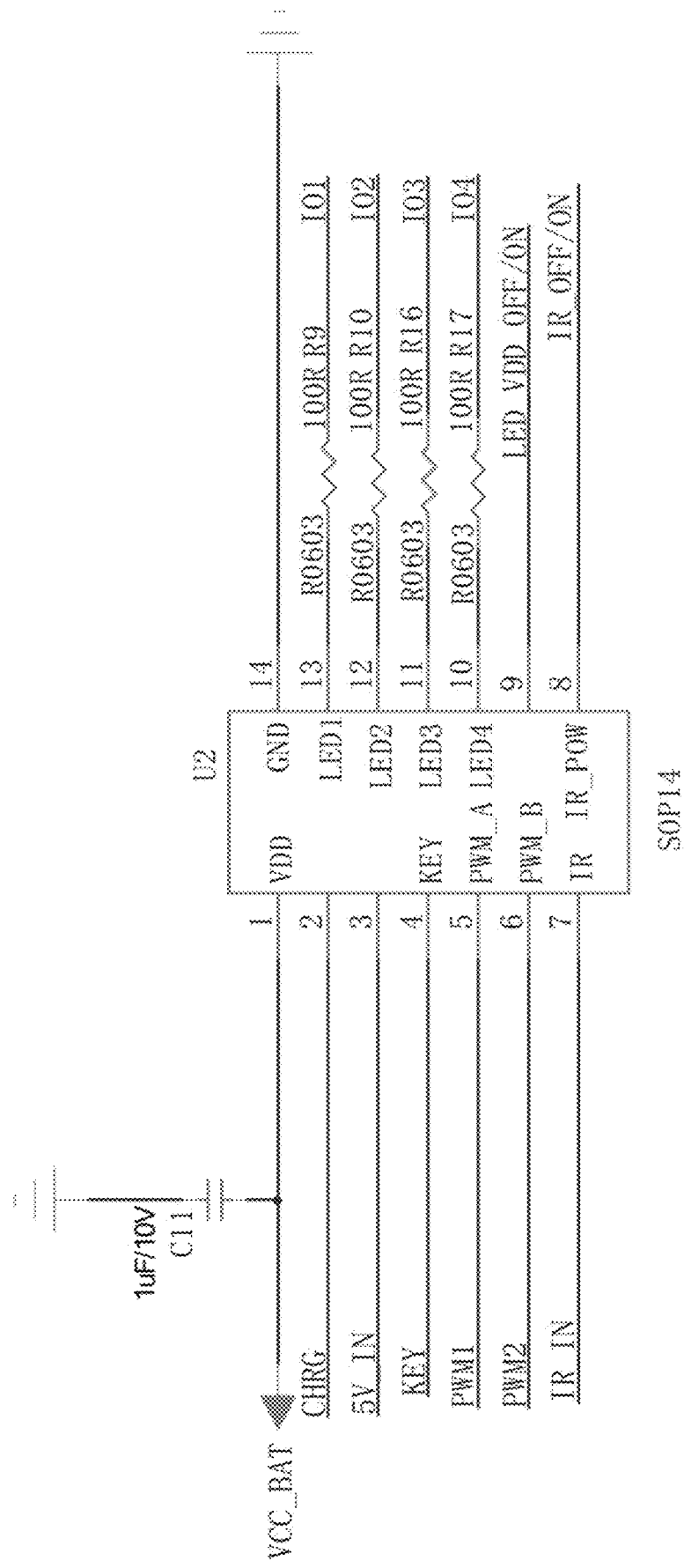
FIG. 4 is a schematic diagram of a circuit structure of a main control chip according to an embodiment of the present invention.
Figure 5:
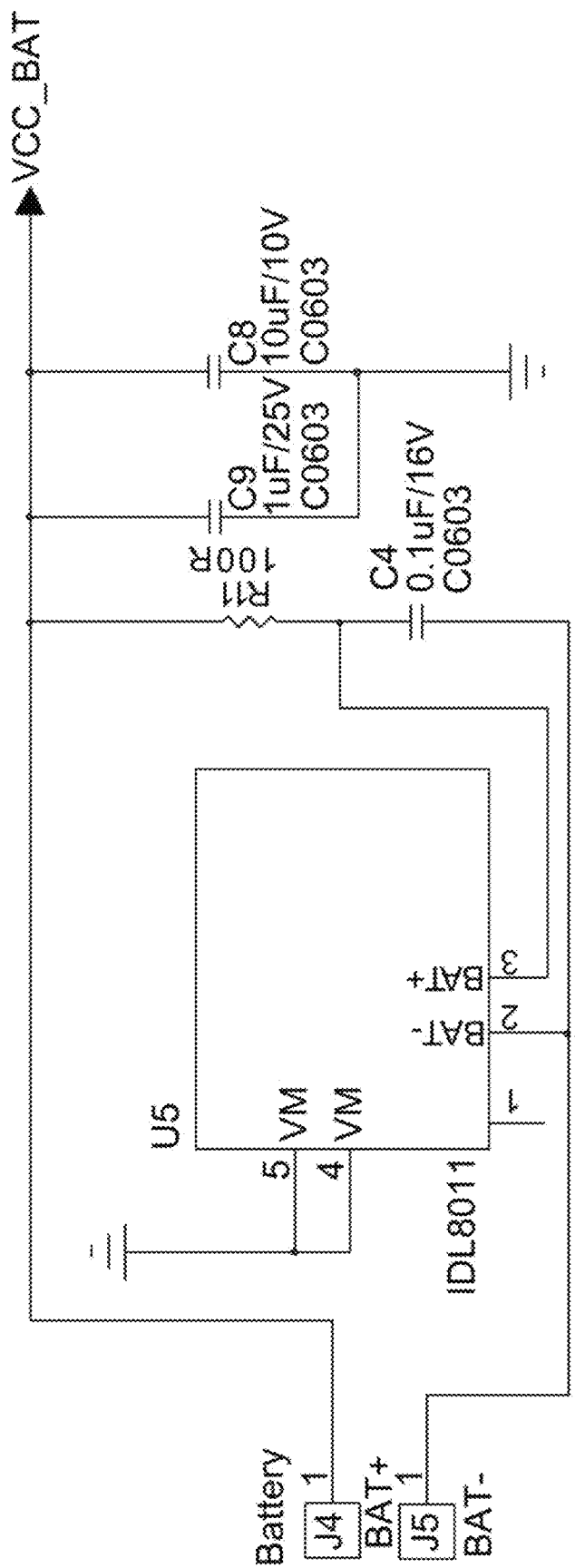
FIG. 5 is a structural diagram of a battery protection circuit according to an embodiment of the present invention.
Figure 6:
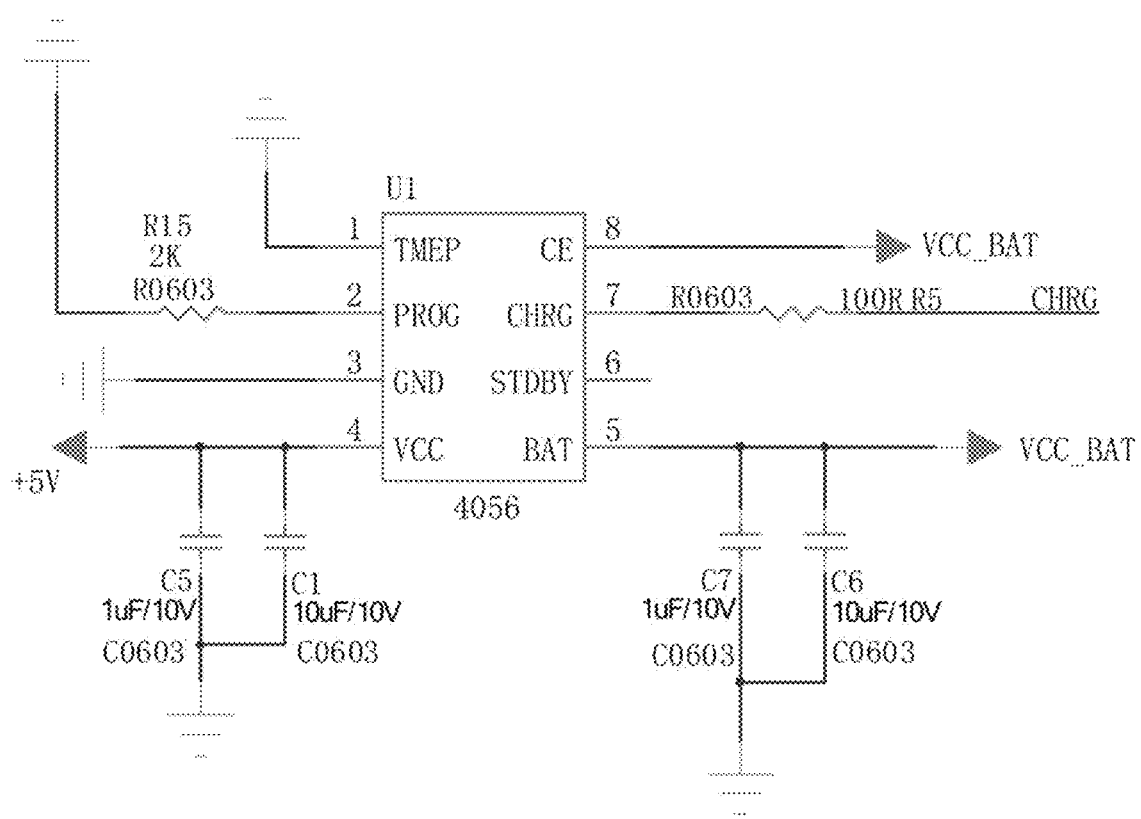
FIG. 6 is a structural diagram of a charging protection circuit according to an embodiment of the present invention.
Figure 7:
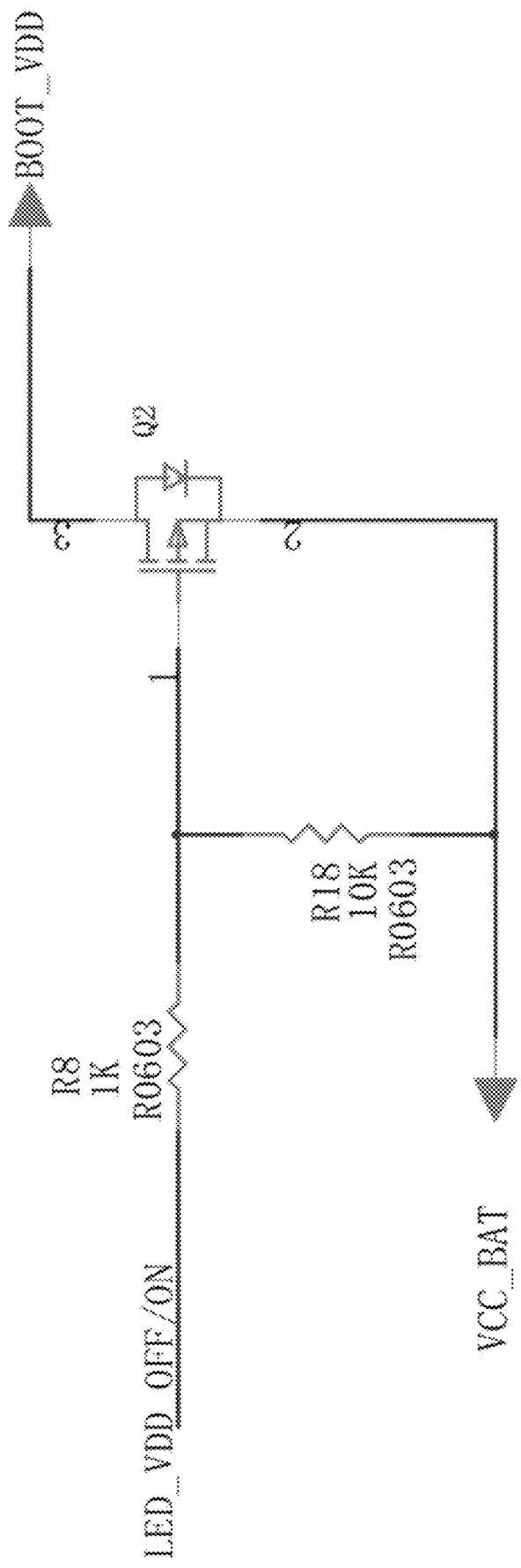
FIG. 7 is a structural diagram of a standby low-power control circuit according to an embodiment of the present invention.
Figure 8:
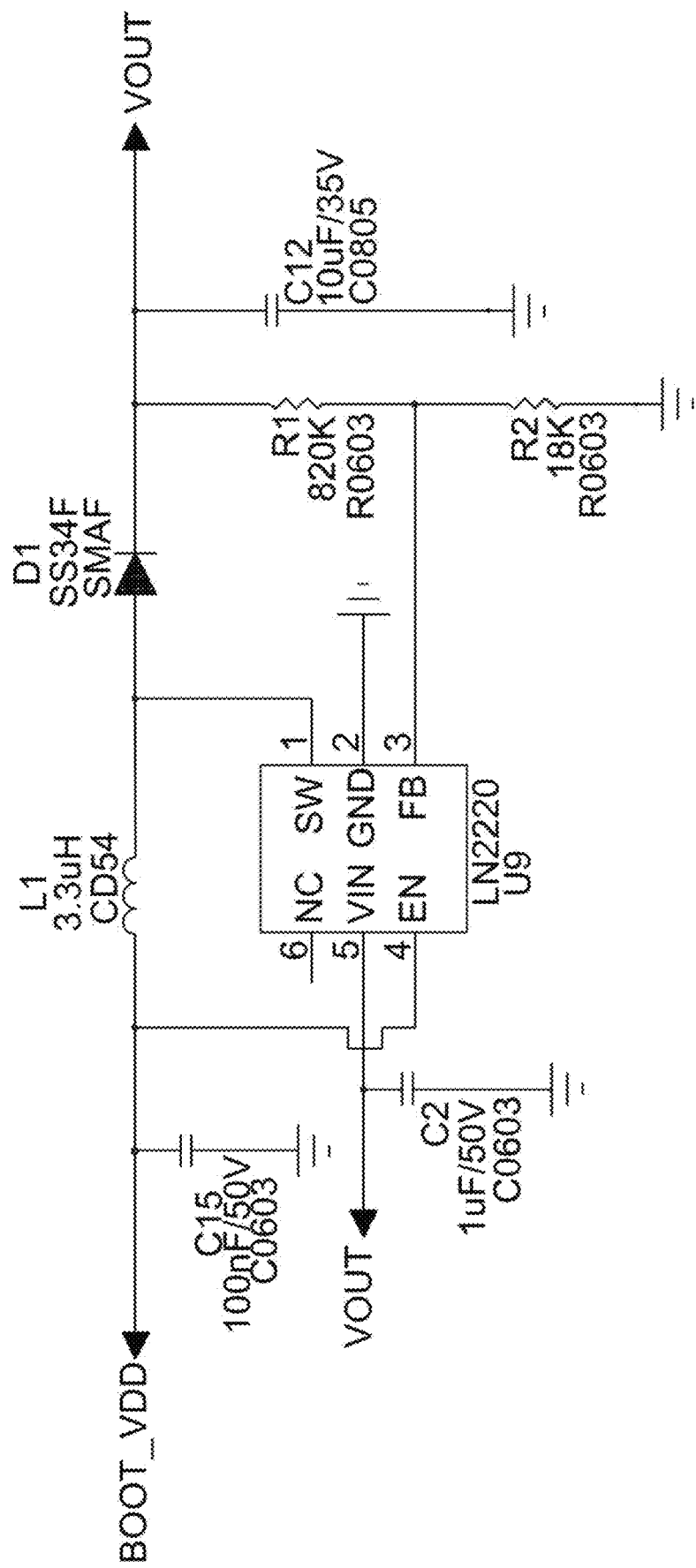
FIG. 8 is a structural diagram of a booster circuit according to an embodiment of the present invention.
Figure 9:
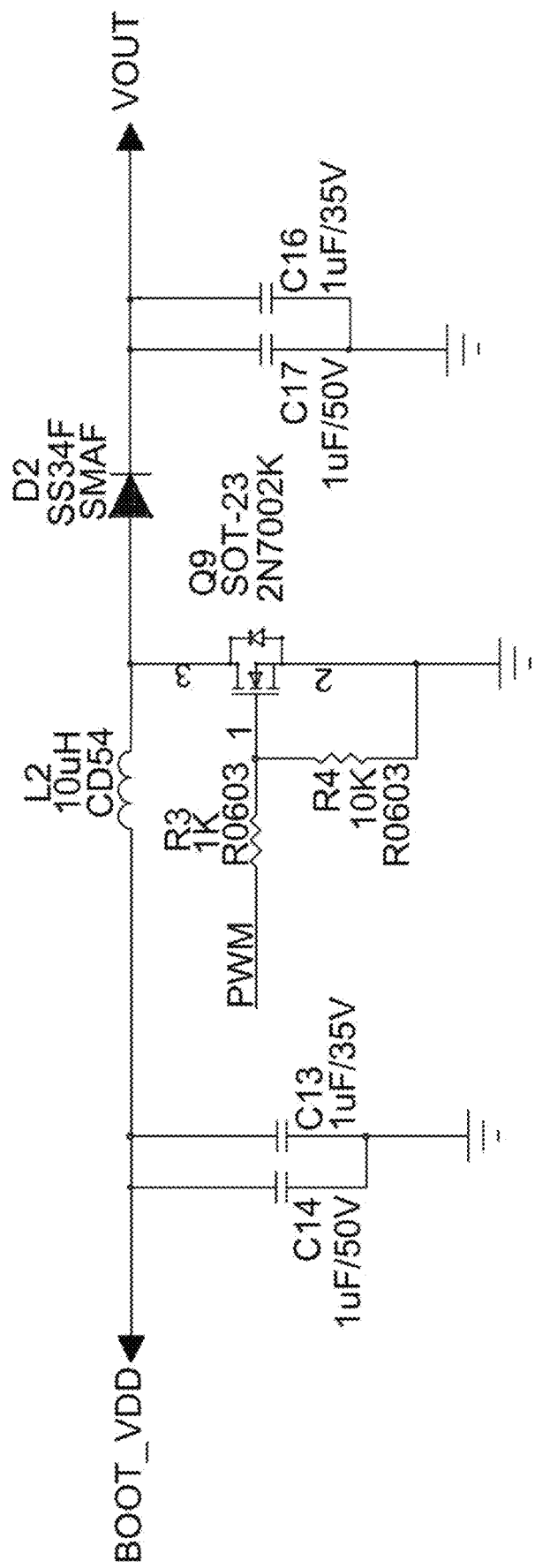
FIG. 9 is another structural diagram of a booster circuit according to an embodiment of the present invention.
Figure 10:
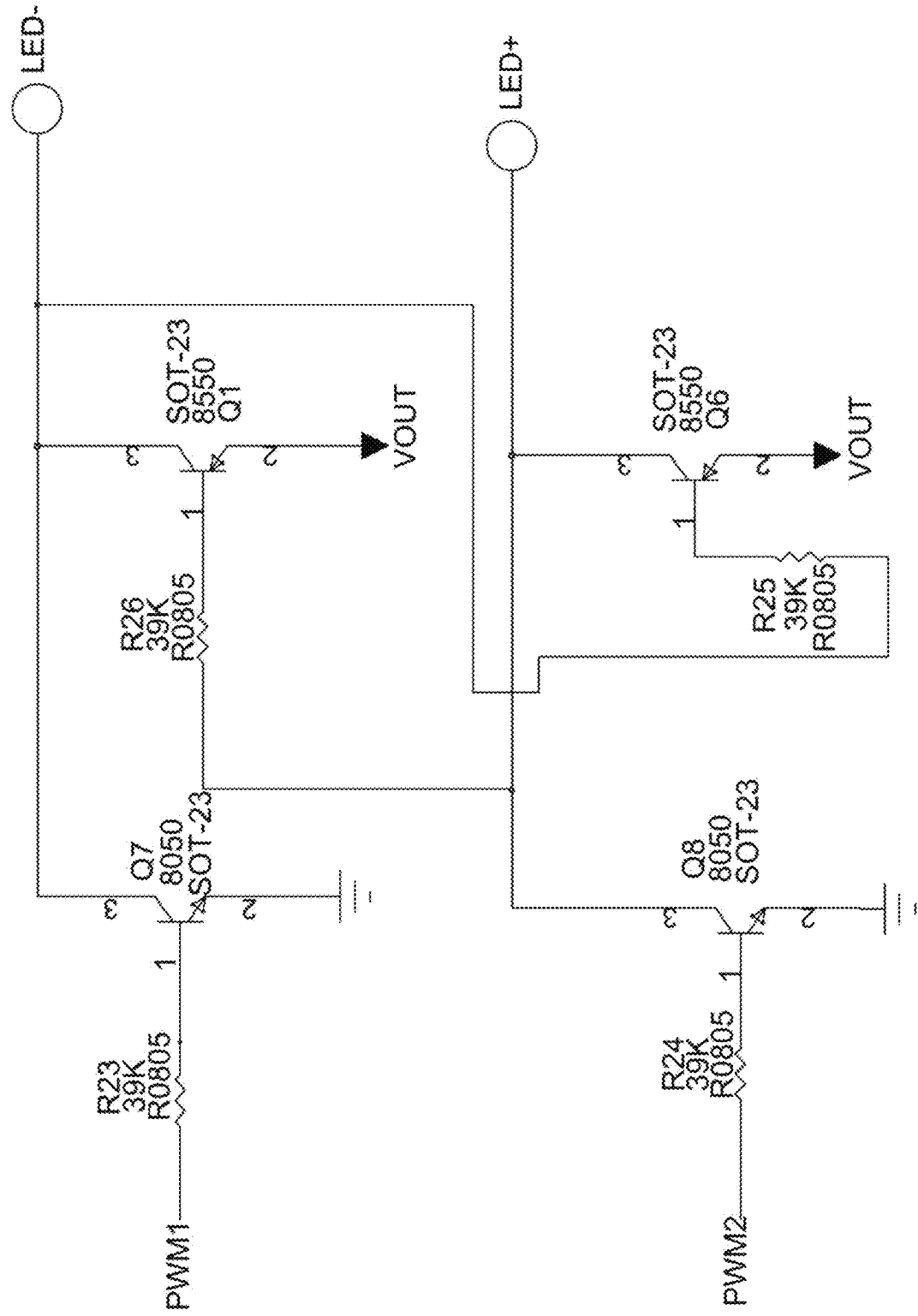
FIG. 10 is a structural diagram of a string light driving circuit according to an embodiment of the present invention.
Figure 11:
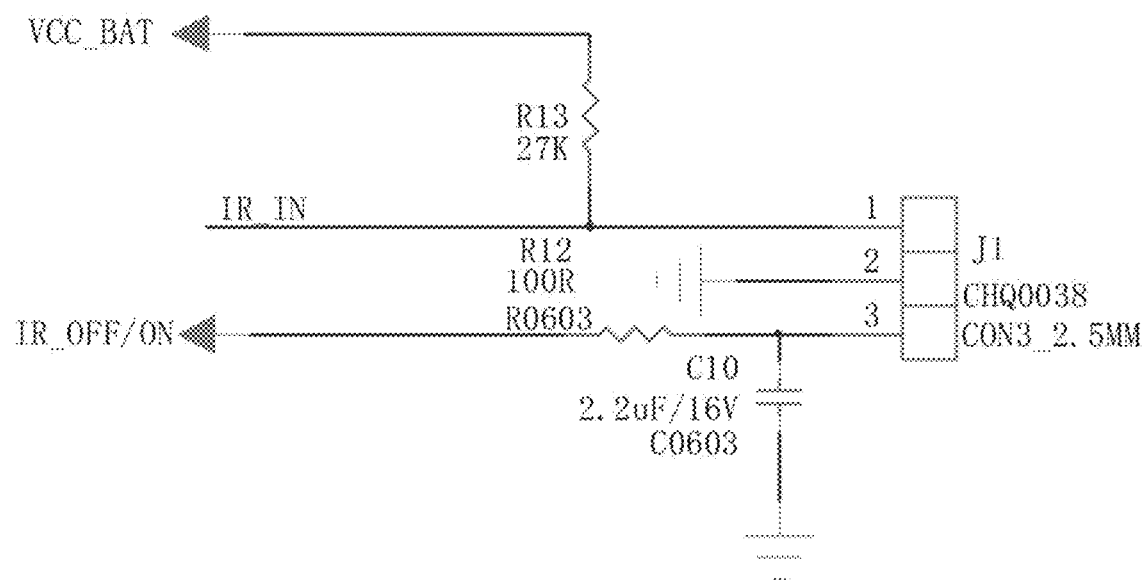
FIG. 11 is a schematic diagram of a circuit structure of an infrared receiving module according to an embodiment of the present invention.

In order to make the object, technical solutions and advantages of the present invention clearer, the present invention is described in further detail below in conjunction with attached drawings and embodiments. It should be understood that the specific embodiments described here are only for explaining the present invention, and do not limit the present invention.

In the description of the present invention, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise" and "anticlockwise" are based on the directional or positional relationships shown in the drawings, which are only for the purpose of facilitating and simplifying the description of the present invention, but do not indicate or imply that the referred devices or elements must be a specific orientation or be constructed and operated in a specific orientation, so they cannot be understood as limitations the invention. In addition, the terms "first" and "second" are only used for the descriptive purpose, and cannot be understood as indicating or implying relative importance or implicitly indicating the number of indicated technical features. Therefore, the features defined with "first" and "second" may explicitly or implicitly include one or more of the features. In the description of the invention, "a plurality of" means two or more, unless otherwise specifically defined.

In the description of the present invention, it should be noted that the terms "install", "link" and "connect" should be understood in a broad sense unless otherwise specified and defined. For example, "connect" may be fixed connection, detachable connection or integrated connection; or, mechanical connection or electric connection; or, direct connection, indirect connection through intermediate media or internal communication of two elements or interaction of two elements. For those of ordinary skill in the art, the specific meaning of the terms mentioned above in the present invention should be construed according to specific circumstances.

As shown in FIGS. 1-11, a string light controller with a charging function provided by this embodiment comprises a shell 1, wherein a main board 2 and a rechargeable battery 3 electrically connected with the main board 2 are installed on the shell 1, the main board 2 is connected with the rechargeable battery 3 through a battery charging and discharging management circuit 4, and the main board 2 is provided with a charging socket 5 connected with the battery charging and discharging management circuit 4; and a port of the charging socket 5 is arranged outside the shell 1, a plug 6 for connecting a string light is arranged on the shell 1, and the plug 6 is electrically connected with the main board 2.

This embodiment involves the installation of the rechargeable battery 3 within the string light controller, along with the necessary circuits to enable charging. This design allows the string light controller to function as both a power source and a charger. In this way, regardless of the presence of electrical sockets, portable power supplies, or battery holders, a string light can be used normally anytime and anywhere, whether indoors or outdoors. This feature greatly benefits market promotion and daily applications.

Further, to facilitate the indication of internal working status, such as battery level indication, remote control, and manual switching, the main board 2 is provided with indicator light beads 7, an infrared receiving module 8 for receiving infrared signals and buttons 9 for user operation, and the shell 1 is provided with corresponding hollowed-out parts 10 at positions exactly opposite to the light beads 7, the infrared receiving module 8 and the buttons 9. The hollowed-out parts 10 allow light to be directed outwards, external infrared signals to be transmitted to the inside, and pressing rods of the buttons 9 to extend out for operators to press. Meanwhile, to prevent the intrusion of foreign matter through the hollowed-out parts 10, a light-pervious cover plate 11 is arranged at the hollowed-out parts 10 of the shell 1, the cover plate 11 is provided with raised pressing caps 12 at positions corresponding to the buttons 9, and the pressing caps 12 abut against the pressing rods of the buttons 9. This approach enables both effective blocking and the unobstructed functioning of internal components. The cover plate 11 can be made of a plastic material.

Similarly, for the purpose of protection, the shell 1 is provided with a soft rubber plug 13 for sealing the charging socket 5 at the position of the charging socket 5.

Moreover, with regard to the circuit system design, the main board 2 is further integrated with a main control chip 100, a standby low-power control circuit 101, a booster circuit 102 and a string light driving circuit 103; the battery charging and discharging management circuit 4 comprises a battery protection circuit 104 and a charging protection circuit 105, one end of the battery protection circuit 104 is connected with the rechargeable battery 3, and the other end of the battery protection circuit 104 is connected with the charging protection circuit 105 and outputs a working power supply; and the main control chip 100 is connected with the infrared receiving module 8, the light beads 7, the buttons 9, the charging protection circuit 105, the standby low-power control circuit 101 and the string light driving circuit 103. During actual operation, the battery protection circuit 104 and the charging protection circuit 105 play a role in protecting the rechargeable battery 3, ensuring normal power output and charging. The standby low-power control circuit 101 is mainly composed of a MOS transistor, and the main control chip 100 controls on-off of the MOS transistor, so as to activate the booster circuit 102. In this embodiment, the booster circuit 102 can adopt various circuit structures, such as the circuit structures shown in FIGS. 8 and 9. After the booster circuit 102 inputs voltage-boosted power to the string light driving circuit 103, the string light driving circuit 103, upon receiving PWM signals from the main control chip 100, controls the operation of internal transistors. Ultimately, the power required for string light operation is input to the plug 6 used for connecting a string light. The specific structure of the plug 6 depends on the connection design of the string light and is typically an aviation plug or a DC plug. The display of the battery level is managed by the feedback from the battery charging and discharging management circuit 4. Then, the main control chip 100 lights up the corresponding light beads 7 to indicate the battery level. Additionally, working modes can be displayed. For example, the light beads 7 arranged in the pattern of the figure eight can form numbers corresponding to specific modes. The corresponding numbers are displayed by lighting up the corresponding light beads 7.

Further, in order to protect the plug 6, the shell 1 is provided with a cover 14 at the position of the plug 6.

Moreover, for easy suspension, one end of the shell 1 is further provided with a suspension loop 15, and the suspension loop 15 is hinged to the shell 1, allowing the string light controller to be hung at a high position during practical application.

Figure 12:
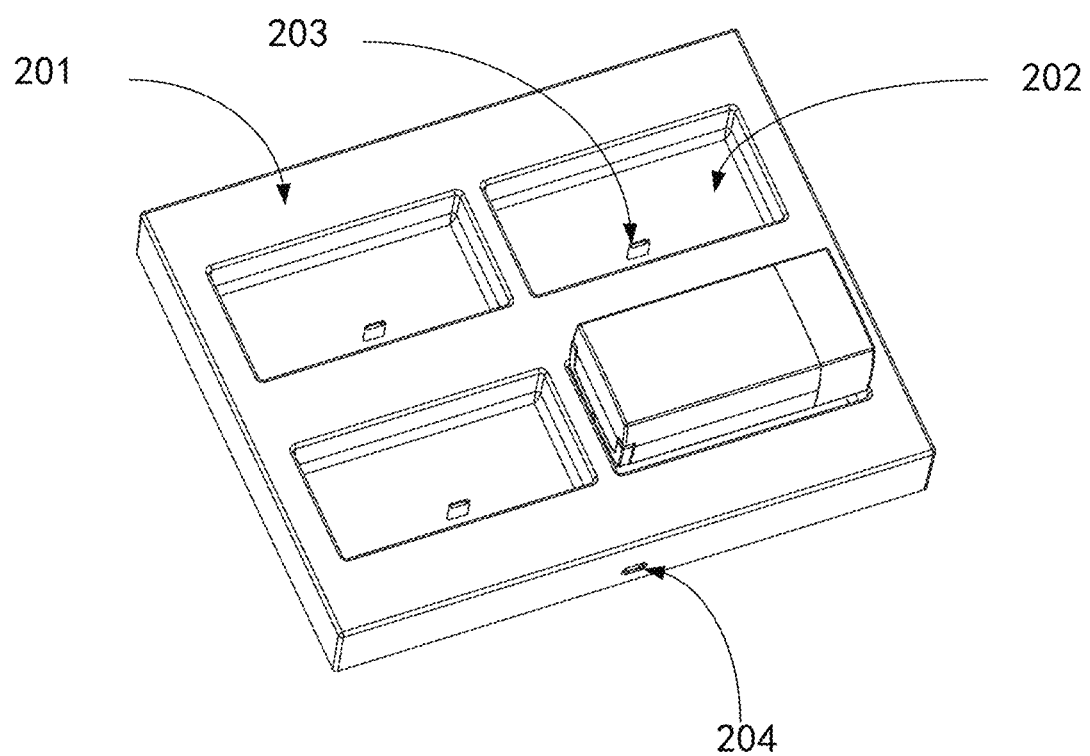
FIG. 12 is a structural diagram of a charging dock according to an embodiment of the present invention.
Figure 13:
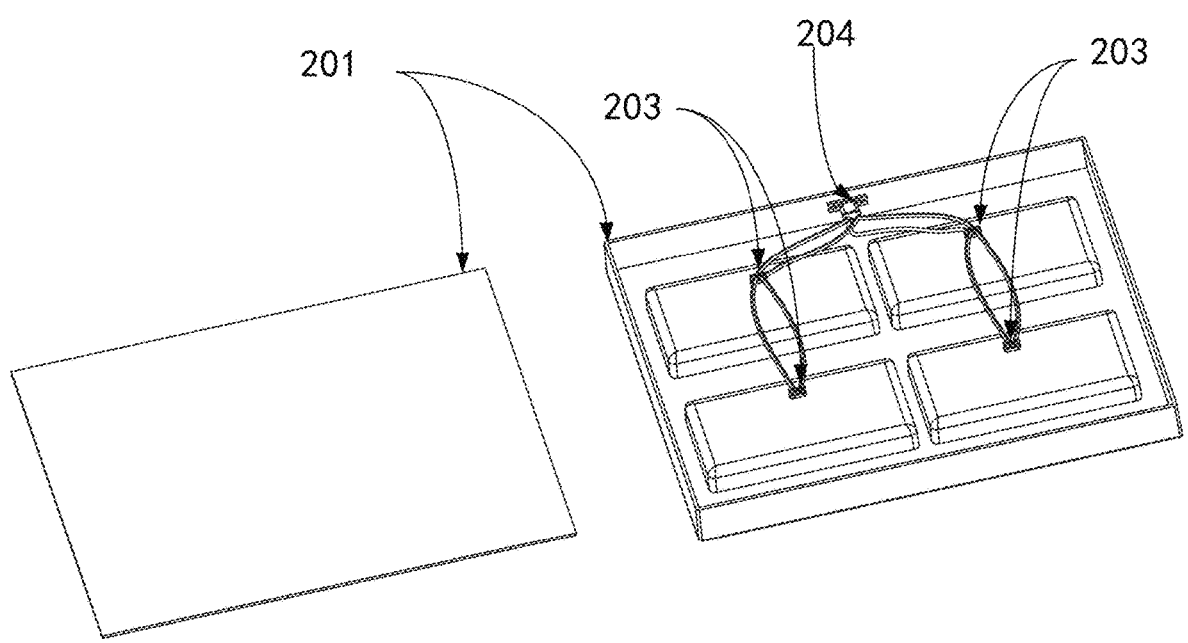
FIG. 13 is an internal structural diagram of a charging dock according to an embodiment of the present invention.

As shown in FIGS. 12 and 13, this embodiment also provides a charging dock for charging the string light controller as described above, which comprises a base 201, wherein at least one slot 202 allowing the string light controller to be inserted therein is arranged on the base 201, a charging plug 203 mating with the charging socket 5 of the string light controller is arranged in the slot 202, a power socket 204 for connecting an external adapter is arranged on the base 201, and all the charging plugs 203 are connected with the power socket 204. When the battery of the string light controller is low, it can be placed in the slot 202, allowing the charging socket 5 of the string light controller to mate with the charging plug 203. Afterwards, the power socket 204 on the base 201 can be connected to an external adapter to charge the string light controller.

The above are only preferred embodiments of the present invention, which do not limit the patent scope of the present invention. Any equivalent structure or equivalent flow transformation made according to the contents of the specification and drawings of the present invention, or directly or indirectly applications to other related technical fields should also fall within the patent protection scope of the present invention.

What is claimed is:

1. A string light controller with a charging function, comprising a shell, wherein a main board and a rechargeable battery electrically connected with the main board are installed on the shell, the main board is connected with the rechargeable battery through a battery charging and discharging management circuit, and the main board is provided with a charging socket connected with the battery charging and discharging management circuit; and a port of the charging socket is arranged outside the shell, a plug for connecting a string light is arranged on the shell, and the plug is electrically connected with the main board; wherein the main board is provided with indicator light beads, an infrared receiving module for receiving infrared signals and buttons for user operation, and the shell is provided with corresponding hollowed-out parts at positions exactly opposite to the light beads, the infrared receiving module and the buttons.

2. The string light controller with a charging function according to claim 1, wherein a light-pervious cover plate is arranged at the hollowed-out parts of the shell, the cover plate is provided with raised pressing caps at positions corresponding to the buttons, and the pressing caps abut against pressing rods of the buttons.

3. The string light controller with a charging function according to claim 2, wherein the shell is provided with a soft rubber plug for sealing the charging socket at the position of the charging socket.

4. The string light controller with a charging function according to claim 1, wherein the main board is further integrated with a main control chip, a standby low-power control circuit, a booster circuit and a string light driving circuit; the battery charging and discharging management circuit comprises a battery protection circuit and a charging protection circuit, one end of the battery protection circuit is connected with the rechargeable battery, and the other end of the battery protection circuit is connected with the charging protection circuit and outputs a working power supply; and the main control chip is connected with the infrared receiving module, the light beads, the buttons, the charging protection circuit, the standby low-power control circuit and the string light driving circuit.

5. The string light controller with a charging function according to claim 1, wherein an end of the shell is further provided with a suspension loop, and the suspension loop is hinged to the shell.

6. A charging dock for charging the string light controller according to claim 1, comprising a base, wherein at least one slot allowing the string light controller to be inserted therein is arranged on the base, a charging plug mating with the charging socket of the string light controller is arranged in the slot, a power socket for connecting an external adapter is arranged on the base, and all the charging plugs are connected with the power socket.

* * * * *